United States Patent [19]
Ott

[11] 3,974,297
[45] Aug. 10, 1976

[54] PACKAGING RESINS
[75] Inventor: John B. Ott, Ashfield, Mass.
[73] Assignee: Monsanto Company, St. Louis, Mo.
[22] Filed: July 19, 1974
[21] Appl. No.: 489,987

[52] U.S. Cl............................ 426/106; 260/45.8 A; 264/94; 264/98; 264/182; 264/211; 264/331
[51] Int. Cl.² .................... B65D 65/38; B29C 17/07
[58] Field of Search ................ 264/94, 97, 98, 211, 264/349, 89, 182, 331; 260/85.5 R, 45.8 A, 45.85 R; 426/106

[56] References Cited
UNITED STATES PATENTS

| | | | |
|---|---|---|---|
| 2,496,508 | 2/1950 | Watson | 260/45.8 A |
| 2,811,505 | 10/1957 | Schulken et al. | 260/45.8 A |
| 2,951,052 | 8/1960 | Darby | 260/45.8 A |
| 3,101,326 | 8/1963 | Montesano | 260/45.8 A |
| 3,313,867 | 4/1967 | Blackburn et al. | 260/45.8 A |
| 3,406,140 | 10/1968 | Polestak et al. | 264/211 |
| 3,737,494 | 6/1973 | Wolf | 264/94 |
| 3,754,851 | 8/1973 | Reilly et al. | 264/98 |
| 3,870,802 | 3/1975 | Harris et al. | 426/106 |

*Primary Examiner*—Jeffery R. Thurlow
*Attorney, Agent, or Firm*—Eugene Zagarella, Jr.; William Farrington

[57] ABSTRACT

A process for reducing the extractable HCN content of packaging materials prepared from molten nitrile polymers which process comprises having styrene oxide in intimate contact with the molten nitrile polymer during the forming steps used to prepare the packaging materials.

34 Claims, No Drawings

PACKAGING RESINS

BACKGROUND OF THE INVENTION

1. Field of the Invention

The present invention relates to improved polymeric nitrile packaging compositions. More particularly, the present invention relates to a process for preparing improved packaging materials for foods, medicines and other related substances from molten nitrile polymers. The process comprises having styrene oxide in intimate contact with the molten polymer during the forming of the packaging materials.

2. Description of the Prior Art

In recent years it has been discovered that certain polymeric nitrile resins are especially suitable for packaging applications because of their excellent water and oxygen barrier properties. Such polymers are described at length in U.S. Pat. Nos. 3,451,538 and 3,615,710, among others. Even more recently it has been discovered that although such nitrile polymers have excellent barrier properties they may be unsuitable for certain packaging applications because they contain trace, though detectable, amounts of hydrogen cyanide (HCN) which may be extracted by and impart a taste to the contents of the package. The amount of HCN in such nitrile polymers will vary with the nitrile monomer, the total nitrile content of the polymer, the polymerization method used to prepare the polymer, the processing and thermal history of the polymer and other factors. Moreover, it has been found that the amount of extractable HCN in nitrile polymers may be increased after the polymer has been subjected to forming operations wherein the polymer has been heated in order to soften and/or melt the polymer prior to forming it into shaped articles, unless precautionary steps are taken.

The trace amount of extractable HCN present in such nitrile packaging materials is very low and presents no known health or safety problems. In fact, the amount of extractable HCN in such nitrile polymers is lower than that found in many foods. In this regard it should be noted that HCN is a natural component in many foods and many other foods such as cereals, cocoa, ham, bacon and sausage, which are fumigated with HCN (prussic acid), are permitted to contain from 50 to 200 parts per million of HCN. (See the Food Additive Regulations of the FDA (Page 31, Subpart D, Paragraph 121,1072) as published in the Federal Register: Dec. 23, 1965; 30 F.R. .15912 and the 1962 Public Health Service Publication 956 "Drinking Water Standards.")

However, as stated above, the HCN in certain nitrile packaging materials may, in certain instances, be extracted and impart a taste to the contents of the package. The problems of HCN extraction as it affects taste, is of concern in the packaging of beverages which are in prolonged intimate contact with the container. In these packaging applications the probability of HCN extraction is very high.

Thus, there exists in the art a need for improved nitrile polymer packaging materials which are substantially free of extractable HCN. This need is fulfilled by the present invention which significantly reduces the amount of extractable HCN in nitrile packaging materials. More particularly, the present invention is especially suitable for the preparation of packaging materials such as bottles, cans, jars, etc., which are used in the packaging of beverages, including carbonated beverages, where the probability of HCN extraction is very high.

SUMMARY OF THE PRESENT INVENTION

The present invention fulfills the aforementioned need by providing nitrile polymeric packaging materials which contain very low amounts of extractable HCN. Food or related substances such as beverages, packaged in these materials extract less than 50 parts per billion ($<$50 PPB) and preferably less than 20 PPB ($<$20 PPB) of HCN.

The present invention comprises an improvement in the process for preparing shaped packaging materials from nitrile polymers containing from 55 to 85% by weight of nitrile monomer units (calculated as acrylonitrile), based on the total polymer weight, which process involves at least one forming operation comprising heating the polymer to a molten state and shaping the polymer, the improvement which comprises having styrene oxide in intimate contact with the nitrile polymer during at least one of the forming operations whereby the extractable HCN content of the resulting packaging material is reduced as determined using a 3.0% acetic acid solution as an extracting liquid and an extraction time of 3 days at 49°C.

PREFERRED EMBODIMENTS

It is preferred in the practice of the processes of this invention to employ nitrile polymers, as defined herein, having an extractable HCN content in excess of 50 PPB and to reduce such HCN content below 50 PPB. More preferably, one would employ nitrile polymers having an extractable HCN content in excess of 20 PPB and reduce such HCN content below 20 PPB. The extractable HCN content, as referred to in the preceding sentences, is the HCN extracted from the polymer after heating and shaping the polymer per se, e.g., in the absence of styrene oxide, using an extraction period of 3 days and 49°C. in accordance with the test procedures hereinafter described.

The high nitrile packaging materials used in the present invention contain from 55% to 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, methylene glutaronitrile, fumaronitrile, etc., as well as mixtures of these monomers. The preferred monomers which are interpolymerized with the nitrile monomers include aromatic monomers such as styrene and alpha methylstyrene; lower alpha olefins containing 2 to 6 carbon atoms such as ethylene, propylene, butylene, isobutylene, etc.; acrylate and methacrylate esters containing 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

Optionally, the high nitrile packaging materials may contain from 0–25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubbery backbone, polyblend of a rubber graft polymer with a matrix polymer, etc.

The preferred nitrile polymers for those packaging applications requiring excellent oxygen and water vapor barrier properties in the packaging materials, are those nitrile polymers containing from 55 to 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from 60 to 83% by weight whereas with methacrylonitrile the preferred range is from 70 to 98% by weight of methacrylonitrile which corresponds to about 55 to 78% by weight of nitrile monomer calculated as acrylonitrile. The preferred comonomers are styrene and alpha methyl styrene. Also preferred are interpolymers such as acrylonitrile/methacrylonitrile/styrene; acrylonitrile/styrene/methyl vinyl ether and acrylonitrile/styrene/ethyl vinyl ether.

The active ingredient in reducing the HCN content of the nitrile polymer is styrene oxide. The styrene oxide may be used alone or in the presence of small amounts of an organic acid activator having a pK of at least 3.0. The pK is the negative logarithm of the acid dissociation constant. The organic acid activator should have a melting point less than 200°C., a boiling point greater than 100°C. The melting point requirement is necessary in order to insure adequate distribution of the activator in the molten polymer while the boiling point requirement minimizes the possibility that the activator will be lost due to volatilization.

In addition, the organic acid activator should be a food grade type acid which is free from constituents such as sulfur, halogen, aromatic groups, etc., which might cause undesirable tastes or odors in the compounded polymers. Examples of organic acid activators used with the styrene oxide compounds of the present invention include acetic, citric, glycollic, itaconic, lactic, malic, pelargonic, pimelic, propionic, succinic and tartaric. The preferred organic acid activator is citric.

The amount of organic acid activator used will depend on several factors such as the amount of extractable HCN in the polymer to be compounded with the styrene oxide, the desired level of extractable HCN in the packaging materials made from the compounded polymer, the amount of styrene oxide used, etc. More particularly, the organic acid activator will be used in an amount not to exceed the amount of styrene oxide. These considerations will be discussed further below.

The amount of styrene oxide used in the present invention is calculated so as to reduce the extractable HCN content of the polymer so that less than 50 parts per billion (<50 PPB) and preferably less than 20 PPB (<20 PPB) of HCN is extracted by food or beverages packaged in the container.

The amount of styrene oxide employed should be sufficient to reduce the extractable HCN content of the nitrile packaging material below 50 PPB, preferably below 20 PPB, but insufficient to impart a taste or odor to the food or beverage packaged therein. In general, the amount of styrene oxide required to achieve this reduction in extractable HCN content will be in the range of from 0.1 to 2.0% by weight based on the weight of the nitrile polymer. In most applications, the amount of styrene oxide will be in the range of from 0.4 to 1.5% by weight.

As stated above, the improved packaging materials of the present invention are prepared by a process which comprises having the styrene oxide in intimate contact with the molten nitrile polymer during the forming of the packaging material. The styrene oxide is combined with the nitrile polymer after the polymerization step, as for example, by steeping the polymer in a liquid containing the styrene oxide or another method is to dry blend the nitrile polymer and the styrene oxide prior to the forming step used to shape the polymer. In still another method, the styrene oxide and the nitrile polymer are dispersed in a liquid medium followed by evaporation of the liquid medium. In still another method, the styrene oxide is injected into the molten polymer during the forming operation. Other methods of forming the intimate blend will become apparent to those skilled in the art upon reading the instant specification.

In general, the preferred method of forming the intimate blend is blending dry nitrile polymer, i.e., less than 1% moisture, with the styrene oxide. It should be noted that precautions should be taken with the compounded polymer in order to minimize or prevent loss of styrene oxide from the blend due to volatilization or by reaction with moisture.

The forming operations used to prepare polymeric packaging materials, e.g., films, sheets, containers, such as bottles, cans, jar, etc., in accordance with this invention are carried out by shaping the nitrile polymers in an essentially solvent-free condition by procedures well known in the art and which do not require further explanation here. These forming operations include both the heating step, wherein the nitrile polymer is heated to the molten state by subjecting it to temperatures in the range of from 93° to 274°C. in order to soften or melt or otherwise enable shaping of the polymer, and any subsequent steps performed on such molten nitrile polymer. The heating and shaping steps may occur sequentially or simultaneously. Examples of forming operations used to prepare polymeric packaging materials include pelletizing, extrusion, blow molding, injection molding, parison forming, orientation, vacuum forming, thermoforming, etc.

In certain instances the preparation of packaging materials may involve more than one forming operation wherein the nitrile polymer is heated and shaped. This occurs, for example, in the case of a polymer which is heated to a molten state, extruded and pelletized and then the pellets are heated to a molten state and shaped into a parison which is then shaped into a bottle or some other form of container. In such situations the present invention contemplates having the styrene oxide in intimate contact with the nitrile resin during at least one of the forming operations wherein the polymer is heated to a molten state, i.e., to the point where it softens or melts, and then shaped.

Preferably, when more than one heating step is involved the styrene oxide is brought into intimate contact with the nitrile polymer before or during the first step wherein the polymer is heated to a molten state.

The actual measurement of the amount of HCN extracted by the extracting liquid is not considered to be a part of this invention. In this regard, any method capable of detecting amounts of HCN as low as 20 PPB can be used to measure the amount of extracted HCN. These methods, which are well known to those skilled in the art, include colorimetric measurements, polargraphic measurements, gas chromatographic measurements and electrochemical measurements.

Tests to determine the amount of extractable HCN in packaging material prepared from nitrile polymers are run on molded tensile bars. The extraction tests are run for 3 days at 49°C. using acetic acid as the extracting liquid. The ratio of the surface area of the tensile bars (about 10 square inches) to the volume of extracting liquid used (70 cc) used in the extraction tests approximates the ratio of the surface area of the inside of a 10 ounce beverage bottle (about 40 square inches) which is in contact with the extracting liquid (10 ounces or 297 cc). The ratio of surface area to volume of extracting liquid (square inches/cc) is about 0.135 for the 10 ounce bottles and about 0.143 for the tensile bars used in the examples below. In general, a ratio of surface area/volume of extracting liquid in the range of 0.13/1 to 0.15/1 is adequate for determining extractable HCN for most packaging applications.

The tests described below, using a 3% acetic acid solution (an FDA food simulant for acid type foods) as the extracting liquid, illustrates one of the more difficult packaging applications where there is a high probability of extracting HCN. In other less difficult applications, such as the packaging of dry rice, oranges, bananas, aspirin, etc., such rigorous tests for determination of extractable HCN may not be necessary. At any rate, those skilled in the art, upon reading the present specification, can readily select test samples and test conditions to suit their particular needs.

The following examples are set forth in illustration of the present invention and should not be construed as limitations thereof. All parts and percentages of resin and styrene oxide are by weight unless otherwise specified. Wherever convenient, acrylonitrile is abbreviated as AN and methacrylonitrile as MAN and unless otherwise specified 3% acetic acid solution is used as the extraction liquid. The amount of styrene oxide used is expressed by weight based on the weight of the nitrile polymer. The PPB values for extracted HCN refers to nanograms of HCN per gram of extracting liquid.

EXAMPLES 1 to 8

A copolymer containing 70% by weight acrylonitrile and 30% by weight styrene prepared by conventional aqueous polymerization methods is blended with various amounts of styrene oxide and, in certain instances, an organic acid activator. The blends are extruded into dog-bone type molded tesile bars having a surface area of about 10 square inches according to ASTM D-638-68 (Type 1) by molding the nitrile polymer at 218°C. and 1400 psi.

The molded tensile bars are placed in a test tube (25 × 300 mm). Seventy cubic centimeters (cc) of a 3% acetic acid solution (30 grams of glacial acetic acid solution in 970 grams distilled water) are charged to the test tube containing the tensile bar. The test tube is then sealed with a rubber seal lined with Reynolds Reynolon and the tube is placed in a 49°C. oven for 3 days. The test tube is then cooled to room temperature and the amount of HCN extracted into the solution is determined. The test results are summarized in Table I below.

TABLE I

SUMMARY OF EXAMPLES 1 to 8

| Example | Styrene Oxide (%) (1) | Activator (%) (2) | Extractable HCN (PPB) |
|---|---|---|---|
| 1 | None | None | 99 |
| 2 | 0.1 | " | 65 |
| 3 | 0.5 | " | 46 |
| 4 | 1.0 | " | 25 |
| 5 | 1.5 | " | <20 |
| 6 | 2.0 | " | <20 |
| 7 | 1.0 | 1.0 | 33 |
| 8 | 1.0 | 0.1 | <20 |

(1) Percent by weight based on the weight of the nitrile polymer.
(2) Citric acid used in Examples 7 and 8, percent given is by weight based on the weight of the nitrile polymer.

The results of the foregoing table indicate the significant decrease in the level of extractable HCN which is obtained when using styrene oxide in accordance with the present invention. A comparison of Examples 4, 7 and 8 indicate that a small amount of citric acid further reduces the level of extractable HCN. These examples also indicate that the efficiency of the activator reaches a maximum at a certain level of activator and then decreases with increasing amounts used. As stated above, the amount of activator used will depend on the level of extractable HCN in the polymer, the level desired in the finished product and the amount of styrene oxide used.

EXAMPLES 9 to 12

These examples illustrate HCN extraction tests and taste tests on 297 cc (10 ounce) beverage bottles prepared from high nitrile polymers compounded with styrene oxide prepared in accordance with the present invention. The bottles are prepared by blending copolymers containing 72% by weight of acrylonitrile and 28% by weight styrene with various amounts of styrene oxide and an organic acid activator (citric acid) for the styrene oxide. The resulting blends are extruded into pellets using extrusion temperatures in the range of from 216° to 232°C. The pellets are then shaped into parisons at temperatures in the range of from 216° to 232°C. and formed into the final bottles.

The test bottles are rinsed with water, filled with ten ounces (297 cc) of the various extracting solutions (water, ethanol and acetic acid) capped and heated for 1 week at 38°C. The bottles and contents are then cooled to room temperature and the amount of HCN in PPB extracted by the extracting liquid is determined.

Taste tests are conducted on bottles filled with 10 ounces of a well-known commercially available cola beverage (Coca-Cola). The bottles are filled and placed in an oven for 7 days at 38°C. (100°F.) along with the same beverage in a glass bottle. At the end of this period, the contents of the plastic bottles are poured into each of 10 unmarked vessels and the contents of the glass bottle is poured into each of 20 unmarked vessels. Five persons previously trained in taste-test techniques and sensitive to detecting taste due to extracted HCN are chosen to act as a taste panel. Each member of the panel is given two of the vessels containing the cola beverage from the glass bottle and one vessel containing the cola beverage from the plastic bottle. The tasters do not know which one of the three vessels contain the beverage from the plastic bottle and are asked to determine whether one of the three samples has a taste different from that of the other two, and, if so, to designate which one. The panelists are also asked to describe the difference, if possible. This is known as a "Triangle Taste Test." The test is then repeated to determine reproducibility. If a panel detects a taste difference due to HCN in the beverage packaged in a plastic bottle, the plastic bottle is deemed to "fail" the taste test.

The results of the taste tests and HCN extraction tests on the bottles are summarized in Table II below.

TABLE II

SUMMARY OF TASTE AND EXTRACTABLE HCN TESTS ON 296 cc (10 Ounce) BOTTLES

| Example | Styrene Oxide % By Weight | Citric Acid % By Weight | HCN Extraction PPB | Taste Test |
|---|---|---|---|---|
| 9 | None | None | 70 | Fail |
| 10 | 0.3 | 0.03 | 23 | Fail |
| 11 | 0.7 | 0.07 | <20 | Pass |
| 12 | 1.0 | 0.10 | <20 | Pass |

The data in Table II illustrate the improvements in HCN taste properties that is obtained when the extractable HCN content of the packaging material is reduced to less than 20 PPB using styrene oxide, in accordance with the teachings of the present invention. It should be noted that the limit of detectability of HCN for the specially trained test panel is in the range of 20 to 50 PPB for a cola beverage. This limit of detectability will also vary with the product being tested.

It should be noted here, that unless suitable precautions are taken, the styrene oxide may be volatilized prior to the fabrication of the packaging material. The amount remaining in the polymer may be insufficient to reduce the amount of extractable HCN in the resulting packaging materials to acceptable levels.

EXAMPLES 13 to 22

These examples illustrate the use of other epoxide compounds which fail to reduce the level of extractable HCN in molded high nitrile polymers to acceptable limits, i.e., less than 50, preferably less that 20 PPB.

The polymer used in Examples 13 to 19 is a copolymer of 65% by weight acrylonitrile and 35% by weight styrene. The polymer used in Examples 20 to 21 is a copolymer of 70% by weight acrylonitrile and 30% by weight styrene.

The polymers are blended with the epoxide compounds, molded into test specimens and tested as outlined in Examples 1 to 8 above. The results of these tests are tabulated in Table III below.

TABLE III

SUMMARY OF EXAMPLES 13 to 22
HCN EXTRACTION TESTS USING VARIOUS EPOXIDES

| Example | Epoxide (1) | % Citric Acid (2) | HCN Extraction |
|---|---|---|---|
| 13(Control) | None | None | 198 |
| 14 | cyclohexene epoxide (3) | None | 195 |
| 15 | cyclohexene epoxide | 0.1 | 118 |
| 16 | cyclohexene epoxide | 0.3 | 94 |
| 17 | glycidyl ether | None | 187 |
| 18 | glycidyl ether | 0.1 | 107 |
| 19 | biscyclo pentene ether diepoxide | None | 162 |
| 20 (Control) | None | None | 135 |
| 21 | alloocimene diepoxide | 0.1 | 74 |
| 22 | limonene diepoxide | 0.1 | 78 |

(1) % by weight based on the weight of the polymer was used in each example.
(2) % by weight based on the weight of the polymer.
(3) cyclohexene epoxide used is 3,4-epoxycyclohexylmethyl-3,4-epoxy cyclohexane carboxylate.

The results in Table III above illustrate the relative inefficiency of other epoxide compound in regard to reducing the amount of extractable HCN in high nitrile polymers. The control examples happen to have a higher extractable HCN content than those polymers used above in regard to the styrene oxide examples. However, when considered on a % reduction basis, which would allow for differences in the values of extractable HCN in the polymer, styrene oxide still exhibits a greater efficiency in reducing the level of extractable HCN in the polymer.

The present invention also contemplates the use of other additives and ingredients in the polymeric composition which do not adversely effect the taste properties of the resulting packaging materials. Examples of these ingredients include thermal stabilizers, light stabilizers, dyes, pigments, plasticizers, fillers, antioxidants, lubricants, extrusion aids, etc.

It is obvious that many variations may be made in the products and processes set forth above without departing from the spirit and scope of this invention.

What is claimed is:

1. In the process for preparing shaped packaging materials for foods, beverages and related substances from nitrile polymers containing from 55 to 85% by weight, based on the total polymer weight, of a nitrile monomer unit selected from the group consisting of acrylonitrile and mixtures of acrylonitrile and methacrylonitrile wherein the methacrylonitrile is present in amounts up to 16% by weight based on the total polymer weight, which process involves at least one forming operation comprising heating the polymer in an essentially solvent free condition to a molten state and shaping the polymer into a packaging material, the improvement which comprises having styrene oxide in intimate contact with the nitrile polymer before or during at least one of the forming operations wherein the polymer is heated to a molten state, said styrene oxide being employed in an amount sufficient to provide a shaped packaging material having an extractable HCN content below 50 parts per billion.

2. The improved process of claim 1 wherein the nitrile monomer is acrylonitrile.

3. The improved process of claim 1 wherein an organic acid activator is used in combination with the styrene oxide, said organic acid activator being used in an amount not to exceed the amount of styrene oxide.

4. The improved process of claim 3 wherein the organic acid activator is citric acid.

5. The improved process of claim 1 wherein the nitrile polymer and styrene oxide are dry blended together before being heated to the molten state and formed into packaging material.

6. The improved process of claim 1 wherein the amount of styrene oxide used is in the range of from 0.4 to 1.5% based on the weight of the nitrile polymer.

7. The improved process of claim 1 wherein the forming operation is a blow molding operation.

8. The improved process of claim 1 wherein the forming operation is an injection molding operation.

9. In the process for preparing molded containers for packaging foods, beverages and related substances from a polymer of acrylonitrile and at least one comonomer selected from the group consisting of styrene, alpha methyl styrene, methacrylonitrile, lower alpha olefins containing 2 to 6 carbon atoms, alkyl esters of acrylic and methacrylic acid wherein the alkyl group contains from 1 to 4 carbon atoms, vinyl acetate and alkyl vinyl ethers wherein the alkyl group contains from 1 to 4 carbon atoms, and mixtures thereof; wherein the polymer contains from 60 to 83% by weight of acrylonitrile and from 0 to 16% by weight of methacrylonitrile, based on the total polymer weight, and having an extractable HCN content in excess of 20 PPB, which process involves at least one forming operation comprising heating the polymer in an essentially solvent free condition to a molten state and shaping the polymer into a molded container, the improvement which comprises having styrene oxide in intimate contact with the acrylonitrile polymer before or during at least one of the forming operations wherein the polymer is heated to a molten state, said styrene oxide being employed in an amount sufficient to reduce the extractable HCN content of the resulting molded containers below 20 PPB.

10. The improved process of claim 9 wherein the acrylonitrile polymer contains a styrene comonomer.

11. The improved process of claim 9 wherein the acrylonitrile polymer contains an acrylonitrile comonomer.

12. The improved process of claim 9 wherein the forming operation is an extrusion operation.

13. The improved process of claim 9 wherein the forming operation is a blow molding operation.

14. The improved process of claim 9 wherein the forming operation is an injection molding operation.

15. The improved process of claim 9 wherein an organic acid activator is used in combination with the styrene oxide, said organic acid activator being used in an amount not to exceed the amount of styrene oxide.

16. The improved process of claim 15 wherein the organic acid activator is citric acid.

17. The improved process of claim 9 wherein the acrylonitrile polymer and the styrene oxide are dry blended.

18. The improved process of claim 9 wherein the amount of styrene oxide used is in the range of from 0.4 to 1.5% by weight based on the weight of the nitrile polymer.

19. In the process for preparing molded containers for foods, beverages and related substances from acrylonitrile/styrene copolymers containing from 60 to 83% by weight of acrylonitrile, based on the total polymer weight, and having an extractable HCN content in excess of 20 PPB, which process involves a forming operation comprising heating the polymer in an essentially solvent free condition to a molten state and shaping the polymer into molded containers, the improvement which comprises having from 0.1 to 2.0% by weight, based on the weight of the nitrile polymer of styrene oxide and citric acid, in an amount not to exceed the amount of styrene oxide, in intimate contact with the acrylonitrile polymer before or during the forming operation wherein the polymer is heated to a molten state, whereby the extractable HCN content of the resulting molded containers is reduced below 20 PPB.

20. Packaging materials prepared by the process of claim 1.

21. Packaging materials prepared by the process of claim 9.

22. Packaging materials prepared by the process of claim 19.

23. Packaging materials in the form of a bottle prepared by the process of claim 1.

24. Food, beverages and other related substances packaged in the packaging materials of claim 20.

25. Food, beverages and other related substances packaged in the packaging materials of claim 21.

26. Food, beverages and other related substances packaged in the packaging materials of claim 22.

27. In the process for preparing bottles and jars, for packaging food, beverages and relates substances, from polymers of acrylonitrile and styrene containing from 60 to 83% by weight of acrylonitrile, based on the total polymer weight, and having an extractable HCN content in excess of 50 PPB, which process involves a forming operation comprising heating the polymer in an essentially solvent free condition to a molten state and shaping the polymer into bottles or jars, the improvement which comprises having styrene oxide in intimate contact with the acrylonitrile polymer before or during the forming operation wherein the polymer is heated to a molten state, said styrene oxide being employed in an amount sufficient to reduce the extractable HCN content of the resulting bottles and jars is below 50 PPB.

28. The improved process of claim 27 wherein the copolymer further contains a rubber component.

29. The improved process of claim 27 wherein an organic acid activator is used in combination with the styrene oxide, said organic acid activator being used in an amount not to exceed the amount of styrene oxide.

30. The improved process of claim 27 wherein the organic acid activator is citric acid.

31. In the process for preparing bottles and jars, for packaging food, beverages and related substances, from polymers of acrylonitrile and styrene containing from 60 to 83% by weight of acrylonitrile, based on the total polymer weight, and having an extractable HCN content in excess of 20 PPB, which process involves a forming operation comprising heating the polymer in an essentially solvent free condition to a molten state and shaping the polymer into bottles and jars, the improvement which comprises intimately dry blending the acrylonitrile polymer and styrene oxide before heating the polymer to a molten state and shaping it into bottles or jars, said styrene oxide being employed in an amount sufficient to reduce the extractable HCN content of the resulting bottles and jars below 20 PPB.

32. The improved process of claim 31 wherein an organic acid activator is used in combination with the styrene oxide, said organic acid activator being used in an amount not to exceed the amount of styrene oxide.

33. The improved process of claim 31 wherein the organic acid activator is citric acid.

34. The improved process of claim 31 wherein the copolymer further contains from 0 to 25% of a natural or synthetic rubber component.

* * * * *